Feb. 5, 1924.   1,482,423
L. F. YOUNG ET AL
DUMPING VEHICLE
Filed Jan. 20, 1921   3 Sheets-Sheet 2

Lawrence F. Young.
Walter Ferris.
INVENTOR

WITNESSES

BY
ATTORNEYS

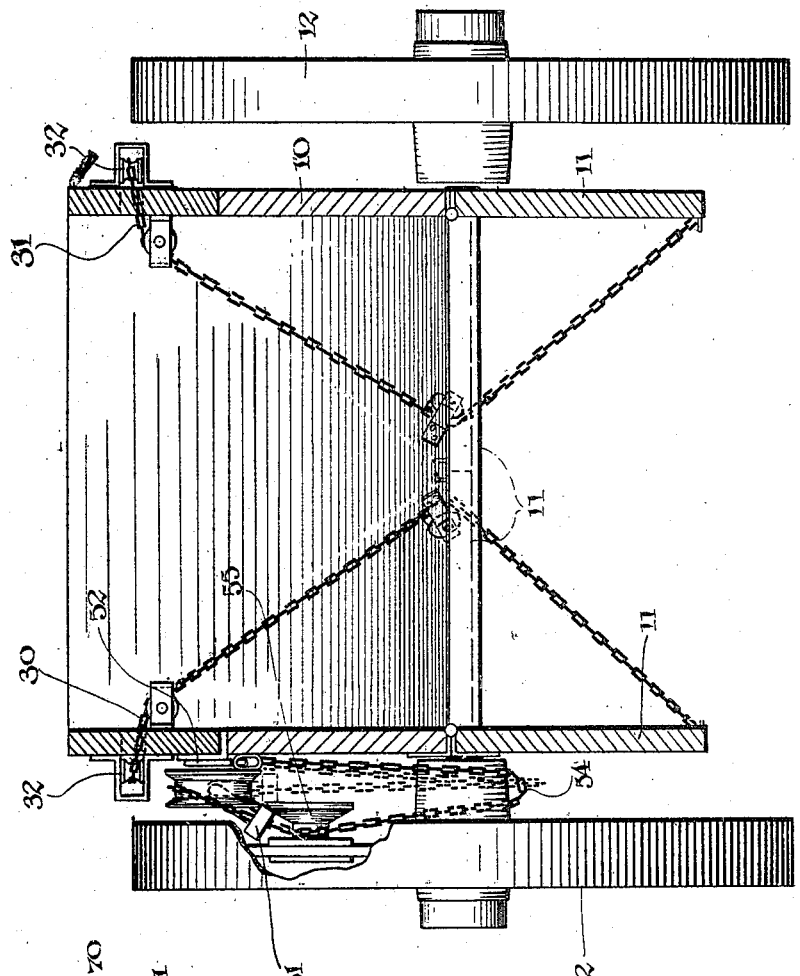
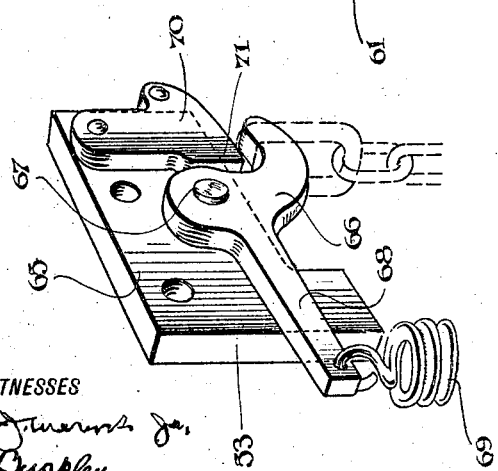

Patented Feb. 5, 1924.

1,482,423

UNITED STATES PATENT OFFICE.

LAWRENCE FRANKLIN YOUNG AND WALTER FERRIS, OF MILWAUKEE, WISCONSIN, ASSIGNORS TO W. L. THOMPSON, OF GREENVILLE, MISSISSIPPI.

DUMPING VEHICLE.

Application filed January 20, 1921. Serial No. 438,633.

*To all whom it may concern:*

Be it known that we, LAWRENCE F. YOUNG and WALTER FERRIS, citizens of the United States, and residents of Milwaukee, in the county of Milwaukee and State of Wisconsin, have invented certain new and useful Improvements in Dumping Vehicles, of which the following is a specification.

The present invention relates in general to dumping vehicles, and more particularly to operating means for dumping vehicles of the gravity dump type.

The object of the invention is to provide operating means for dumping vehicles of this character, which may be conveniently and easily controlled, either directly or remotely, which provides for the automatic righting-up of the dumping means and which is of simple and durable construction, reliable in operation, and easy and inexpensive to manufacture.

Other objects and advantages reside in the certain novel features of the construction, combination and arrangement of parts which will be hereinafter more fully described, and particularly pointed out in the appended claims, reference being had to the accompanying drawings forming a part of this specification, and in which—

Figure 1:
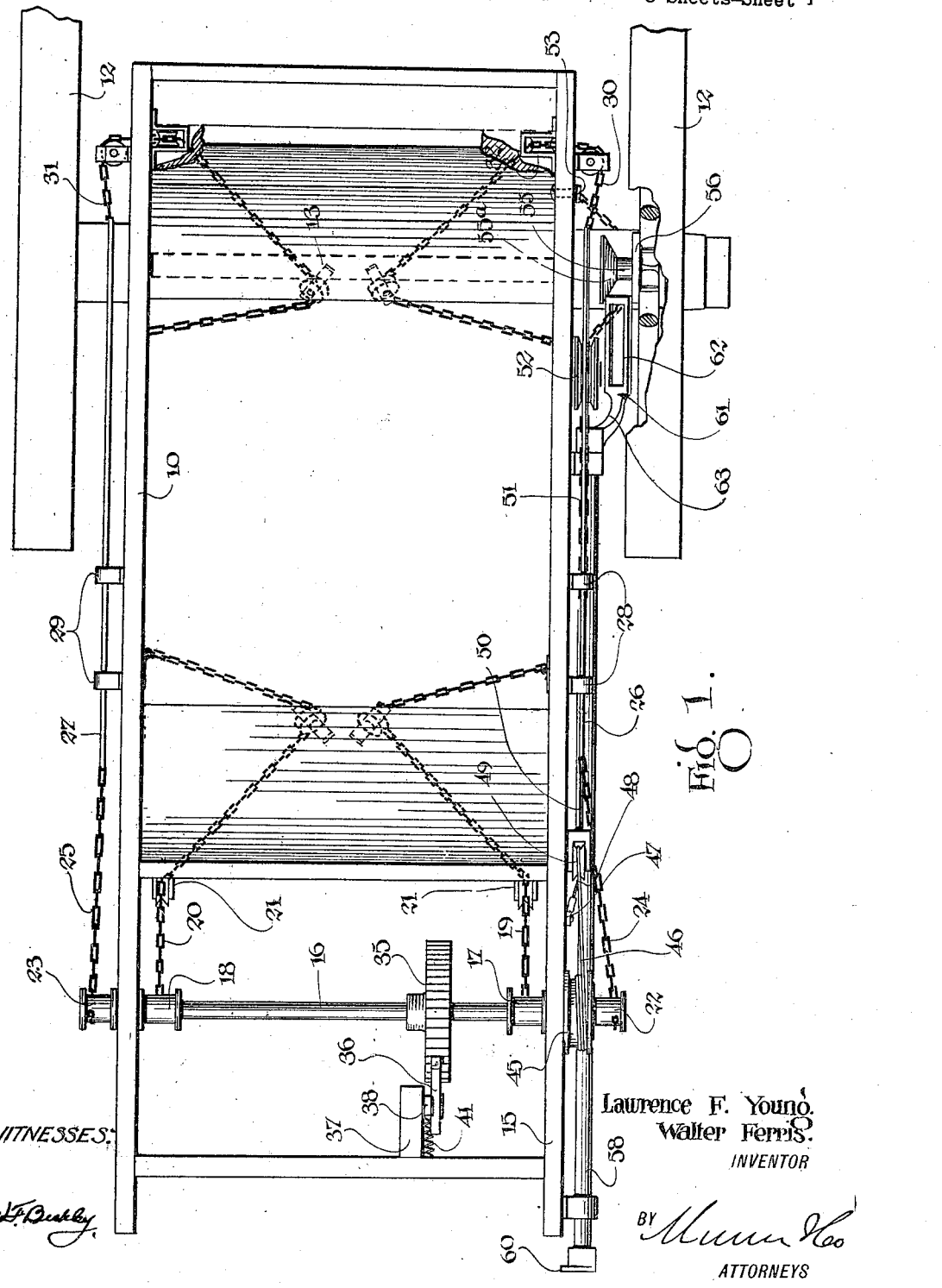
Figures 2, 3, 4:
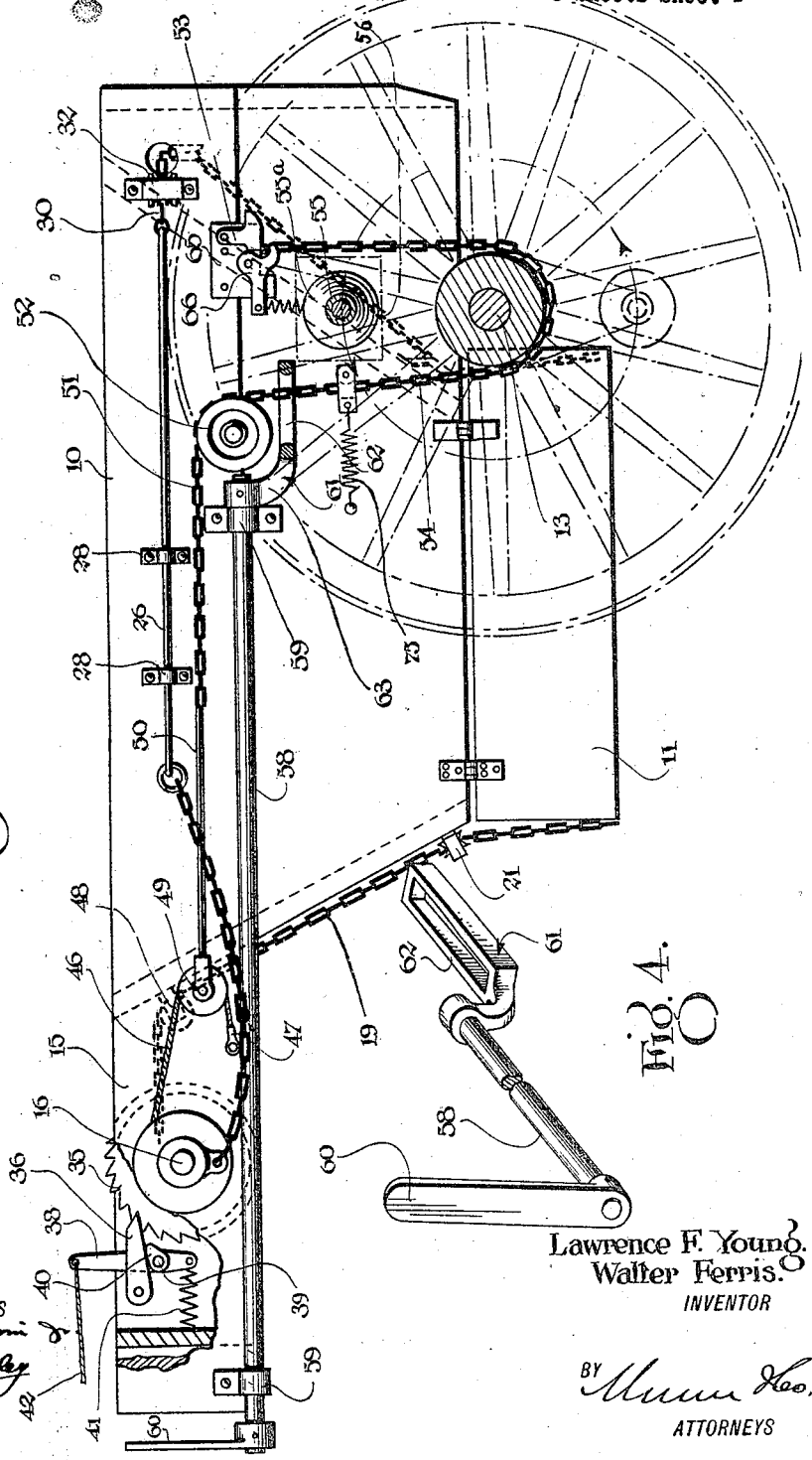

Figure 1 is a plan view of the invention, with parts being broken away and shown in section for the sake of illustration, Figure 2 is a side elevational view thereof, with parts being broken away and shown in section for the sake of illustration, Figure 3 is a rear elevational view, parts being broken away and shown in section for the sake of illustration, Figure 4 is a fragmentary detail perspective view of the controller, Figure 5 is a fragmentary detail perspective view of the automatic release anchor.

Referring to the drawings wherein for the sake of illustration is shown the preferred embodiment of the invention, the dumping vehicle with which the invention is associated comprises a body designated at 10 having gravity dump doors 11 pivotally connected to the lower end of the body. The body is arranged upon suitable ground wheels 12 by means of an axle 13. At the forward end of the body an extension 15 is provided, and may be supported upon the draw-head of a tractor or upon suitable running gear if it is desired to use animal draft.

A winding shaft 16 is rotatably journaled in the extension 15 and has fixed thereto, preferably within the extension, winding reels 17 and 18, upon which respectively the righting-up chains 19 and 20 for the forward end of the dump doors, are wound. These righting-up chains 19 and 20 are connected at one end to the winding drums and are then led over suitable guide pulleys or sheaves designated at 21, to the forward end of the dump doors to which they are connected. Winding reels 22 and 23 are also fixed to the winding shaft, preferably exteriorly of the extension and upon the reels 22 and 23, righting-up chains 24 and 25 respectively are adapted to be wound. The chains are connected at one end to the reels and at the other end to connecting rods 26 and 27, respectively slidably arranged in brackets 28 and 29, respectively, fixed to the side of the wagon body. The connecting rods have their rear ends connected to adjacent ends of chains 30 and 31, which are led over suitable guide pulleys or sheaves 32 to be connected at their far ends to the rear ends of the bottom dump doors.

A ratchet wheel 35 is fixed to the winding shaft 16 within the extension, and is adapted to cooperate with a pawl 36 pivoted to a bracket 37 mounted upon the extension 15. The pawl 36 is normally operated upon by gravity to engage the ratchet wheel 35 and thus maintain the winding shaft in set position. A release lever 38 is pivotally mounted at 39 upon the bracket 37 and is provided with a lifting toe 40 engageable with the pawl 36 to raise it out of engagement with the ratchet wheel 35. A retractile coil spring 41 engages the lower end of the release lever 38 and tends to maintain the same in such position that its lifting toe 40 will not engage the pawl 39. If a remote control is used, a flexible connecting element 42 is fixed to the release lever and extends to the point of control.

Actuating means is provided for imparting righting-up movement to the winding shaft 16, and includes a pulley or winding sheave 45 fixed to the winding shaft 16 and adapted to receive the convolutions of a cord, cable or similar flexible element 46, one end of which is secured to the winding sheave and the other of which is secured as at 47 to the extension or other stationary part to form a loop 48. A pulley 49 is received in the bight of the loop 48 and is rotatably mounted at one end of a rod 50 which in turn is secured at its other end to a flexible element 51 preferably in the form of a chain. The flexible element 51 is led from the rod 50 over a guide pulley 52, and then downwardly under and around the axle of the vehicle or the hub of the adjacent wheel and upwardly on the opposite side of the wheel to the anchor 53 to be hereinafter more fully described. The portion of the flexible element or chain 51 which extends from the pulley 52 to the anchor 53 constitutes a loop which is designated at 54. An inwardly extending projection designated at 55 is provided on the ground wheel 12 adjacent the loop 54 of the flexible element 51, and is preferably in the form of a half spool as shown in the drawings, the single end plate or cheek of which has an inwardly inclined surface designated at 55ª. This projection or spool is mounted upon a base 56 which is adjustably secured in any suitable manner as by U-bolts or the like, to the spokes of the wheel. It is apparent that the degree of movement imparted to the flexible element is controlled or determined by the distance at which the projection is spaced from the center of the wheel. As more clearly shown in dotted lines in Figure 3, the loop 54 normally hangs or lies in a plane spaced from the path of travel of the projection 55, so that normally when the reel revolves the projection 55 which of course is carried with the wheel and partakes of its motion, clears the loop and does not engage or in any wise affect the same.

A controller is provided for swinging the loop or a portion thereof into the path of travel of the projection whereby the loop will be engaged and elongated by the projection. The controller includes a rotatable controller shaft 58 journaled in suitable bearings 59 and having at one end an operating lever 60 and at the other end adjacent the loop 54, a control bar 61 fixed thereto. The body of the control bar 61 is provided with a slot 62 through which the chain of the loop 54 extends, and this body is offset from the shaft 58 by means of a curved arm 63. It is obvious that when the operating lever 60 is moved it will swing the body of the control bar in an arc and may be operated to swing it outwardly so that the loop 54 will be moved into the path of the projection 55. The bar 61 is arranged radially of the shaft 58 and its center of gravity is such that it operates to return the bar to normal position shown in dotted lines in Figure 3, at which position the loop lies out of the path of travel of the projection.

The anchor 53 for the chain or flexible element 51, as shown in detail in Figure 5, comprises a base plate 65 secured to the wagon body to which a hook 66 is pivoted at 67. The hook 66 receives the end link and chain and the hook includes an arm 68 to which is connected a retractile coil spring 69 under tension and effective to throw the hook 66 in a direction opposite to the pull exerted by the chain 51. A pivoted release block 70 is also mounted upon the base plate and has a shoulder 71 which frictionally engages the top of the end link of the chain to prevent accidental displacement of the chain and to constitute a stop or abutment to limit the throw of the hook effected by the spring 69. It is obvious that when obstructions such as roots or the like are tangled in the dump doors and prevent closing of the same, the anchor operates to release the flexible element and thereby prevents the setting up in the component parts of the operating means destructive or injurious stresses.

In operation, when it is desired to effect righting-up of the dump doors, it being understood that the vehicle is advancing, the operator grasps the lever 60 and swings it so that the controlling bar will move the loop 54 of the flexible element into the path of travel of the projection on the ground wheel which constitutes a movable element of the vehicle. As the ground wheel rotates, its projection 55 engages the loop 54 and elongates it. The elongation of the loop effects a rearward movement of the rod 50, and this movement of the rod 50 by means of the pulley 49 carried in the bight of the flexible element 46, unwinds this flexible element from the winding sheave 45 and thus imparts rotary movement to the winding shaft. The rotary movement of the winding shaft effects the winding of the righting-up chains 19 and 20, and 24 and 25, upon their respective winding reels, and thus raises or closes the dump doors.

During this time, the pawl 39 and ratchet wheel 35 operate to maintain the winding shaft against reverse movement, and they also serve this function after the righting-up operation has been completed. In order to release the dump doors, it is merely necessary for the operator to move the release lever 38 which releases the pawl from engagement with the ratchet wheel and permits the gravity dump doors to open.

It is to be noted that when the dump doors are in closed or righted-up position, the loop 54 of the flexible element 51 is elongated and hangs some distance below the same. If this is undesirable, slack may be taken by means of a retractile coil spring secured at one end to the chain and at the opposite end to the wagon body.

We claim:

1. In combination, a dumping vehicle, having gravity dump doors and a ground wheel, a winding shaft, winding reels on said shaft, righting-up chains wound on said reels and connected to said dump doors, actuating mechanism for effecting righting-up movement of said winding shaft including a winding sheave fixed to said winding shaft, a cable having one end secured to and wound on said sheave and having its opposite end fixed to said vehicle, a chain having a loop depending adjacent the ground wheel, a pulley engaging said cable and connected to one end of said chain, a releasable anchorage for the other end of said chain, a half-spool adjustably secured to said ground wheel and projecting laterally therefrom and adapted to normally clear the loop, and a controller for positioning the loop in the path of the spool, including a rotatable shaft, an operating lever therefor, a control bar fixed to said shaft, and having an offset body portion provided with a slot receiving the chain of the body.

2. In combination, a dumping vehicle having gravity dump doors and a ground wheel, a winding shaft, winding reels on said shaft, righting-up chains wound on said reels and connected to said dump doors, actuating mechanism for effecting righting-up movement of said winding shaft including a winding sheave fixed to said winding shaft, a cable having one end secured to and wound on said sheave, and having its opposite end fixed to said vehicle, a chain having a loop depending adjacent the ground wheel, a pulley engaging said cable and connected to one end of said chain, a half-spool adjustably secured to said ground wheel and projecting laterally therefrom and adapted to normally clear the loop, and a controller for positioning the loop in the path of the spool, including a rotatable shaft, an operating lever therefor, a control bar fixed to said shaft, and having an offset body portion provided with a slot receiving the chain of the body.

3. In combination, a dumping vehicle, having gravity dump doors and a ground wheel, a winding shaft, winding reels on said shaft, righting-up chains wound on said reels and connected to said dump doors, pawl and ratchet mechanism for said winding shaft, release means for said pawl and ratchet mechanism, actuating mechanism for effecting righting-up movement of said winding shaft including a winding sheave fixed to said winding shaft, a cable having one end secured to and wound on said sheave and having its opposite end fixed to said vehicle, a chain having a loop depending adjacent the ground wheel, a pulley engaging said cable, and connected to one end of said chain, a half-spool adjustably secured to said ground wheel and projecting laterally therefrom and adapted to normally clear the loop, and a controller for positioning the loop in the path of the spool.

4. In combination, a dumping vehicle, having gravity dump doors and a ground wheel, a winding shaft, winding reels on said shaft, righting-up chains wound on said reels and connected to said dump doors, actuating mechanism for effecting righting-up movement of said winding shaft including a winding sheave fixed to said winding shaft, a cable having one end secured to and wound on said sheave and having its opposite end fixed to said vehicle, a chain having a loop depending adjacent the ground wheel, a pulley engaging said cable and connected to one end of said chain, a half-spool adjustably secured to said ground wheel and projecting laterally therefrom and adapted to normally clear the loop, and a controller for positioning the loop in the path of the spool.

5. In combination, a dumping vehicle having gravity dump doors and a ground wheel, a lateral projecton carried by the ground wheel, means operated by the lateral projection of the ground wheel for effecting righting-up operation of the dump doors, and controlling means for said last mentioned means.

6. In combination, a dumping vehicle having gravity dump doors, and a ground wheel, a projection carried by said ground wheel, righting-up mechanism for said dump doors, and actuating means for said righting-up mechanism including a flexible element having a loop adapted to be engaged and elongated by the projection of the ground wheel to thereby actuate said righting-up mechanism.

7. In combination, a dumping vehicle having gravity dump doors and a ground wheel, a projection carried by said ground wheel, righting-up mechanism for said dump doors, and actuating means for said righting-up mechanism including a flexible element having a loop adapted to be engaged and elongated by the projection of the ground wheel to thereby actuate said righting-up mechanism, and controlling means for said actuating mechanism.

8. Means for imparting operative movement to the winding shaft of the righting-up mechanism of a dumping vehicle, comprising in combination with a movable element of the vehicle having a projection, a flexible element having a loop adapted to be engaged and elongated by the movable element, and means for imparting the movement of said flexible element to said winding shaft.

9. Apparatus for imparting operative movement to the winding shaft of the righting-up mechanism of a dumping vehicle, comprising in combination with a movable element of the vehicle having a projection, a flexible element having a loop normally lying out of the path of the projection of the movable element, controlling means engaging the loop and adapted to position the same in the path of the projection whereby it is engaged and elongated by the projection, and motion transmission means between said flexible element and said winding shaft.

10. Operating means for the dumping mechanism of a vehicle comprising in combination with a movable element having a projection, a flexible element having a loop normally lying out of the path of travel of the projection of said movable element, and controlling means for positioning said loop in the path of travel of said projection.

11. A means for imparting operative movement to the winding shaft of the righting-up mechanism of a dumping vehicle, comprising in combination with a movable element of the vehicle having a projection, a flexible element adapted to be engaged and moved by the movable element, and means for imparting the movement of said flexible element to said winding shaft.

LAWRENCE FRANKLIN YOUNG.
WALTER FERRIS.